(12) United States Patent
Uzan et al.

(10) Patent No.: US 9,623,607 B2
(45) Date of Patent: Apr. 18, 2017

(54) ADDITIVE MANUFACTURING DEVICE

(71) Applicant: Massivit 3D Printing Technologies LTD, Lod (IL)

(72) Inventors: Moshe Uzan, Bet Shemesh (IL); Igor Yakubov, Herzliya (IL)

(73) Assignee: Massivit 3D Printing Technologies LTD, Lod (IL)

( * ) Notice: Subject to any disclaimer, the term of this patent is extended or adjusted under 35 U.S.C. 154(b) by 118 days.

(21) Appl. No.: 14/659,962

(22) Filed: Mar. 17, 2015

(65) Prior Publication Data

US 2015/0231827 A1 Aug. 20, 2015

Related U.S. Application Data

(63) Continuation of application No. 14/265,619, filed on Apr. 30, 2014, now Pat. No. 9,011,136.

(60) Provisional application No. 61/941,494, filed on Feb. 19, 2014.

(51) Int. Cl.
| | |
|---|---|
| *B29C 67/00* | (2006.01) |
| *B33Y 30/00* | (2015.01) |
| *B29L 9/00* | (2006.01) |
| *B33Y 10/00* | (2015.01) |
| *B33Y 50/02* | (2015.01) |
| *B33Y 50/00* | (2015.01) |

(52) U.S. Cl.
CPC ...... *B29C 67/0085* (2013.01); *B29C 67/0055* (2013.01); *B29C 67/0051* (2013.01); *B29C 67/0088* (2013.01); *B29C 67/0092* (2013.01); *B29L 2009/00* (2013.01); *B33Y 10/00* (2014.12); *B33Y 30/00* (2014.12); *B33Y 50/00* (2014.12); *B33Y 50/02* (2014.12)

(58) Field of Classification Search
CPC ............ B29C 67/0051; B29C 67/0055; B29C 67/0059; B29C 67/0085; B29C 67/0088; B29C 67/0092; B33Y 10/00; B33Y 30/00; B33Y 50/00; B33Y 50/02
USPC ...... 425/375, 174.4; 264/241, 308, 494, 496
See application file for complete search history.

(56) References Cited

U.S. PATENT DOCUMENTS

| | | | | |
|---|---|---|---|---|
| 5,216,616 | A * | 6/1993 | Masters | ............ B29C 35/08 156/272.8 |
| 2012/0162305 | A1* | 6/2012 | Swanson | ............ B29C 67/0055 347/20 |

\* cited by examiner

*Primary Examiner* — Alison L Hindenlang
*Assistant Examiner* — Lawrence D Hohenbrink, Jr.
(74) *Attorney, Agent, or Firm* — Manelli Selter PLLC; Edward J. Stemberger

(57) ABSTRACT

An additive manufacturing device is disclosed that enables the manufacturing of 3D objects at a short time. The device uses multiple writing heads to write simultaneously different segments of the object and thus complete the object manufacture in a shorter time as compared to a one head additive manufacturing device.

14 Claims, 11 Drawing Sheets

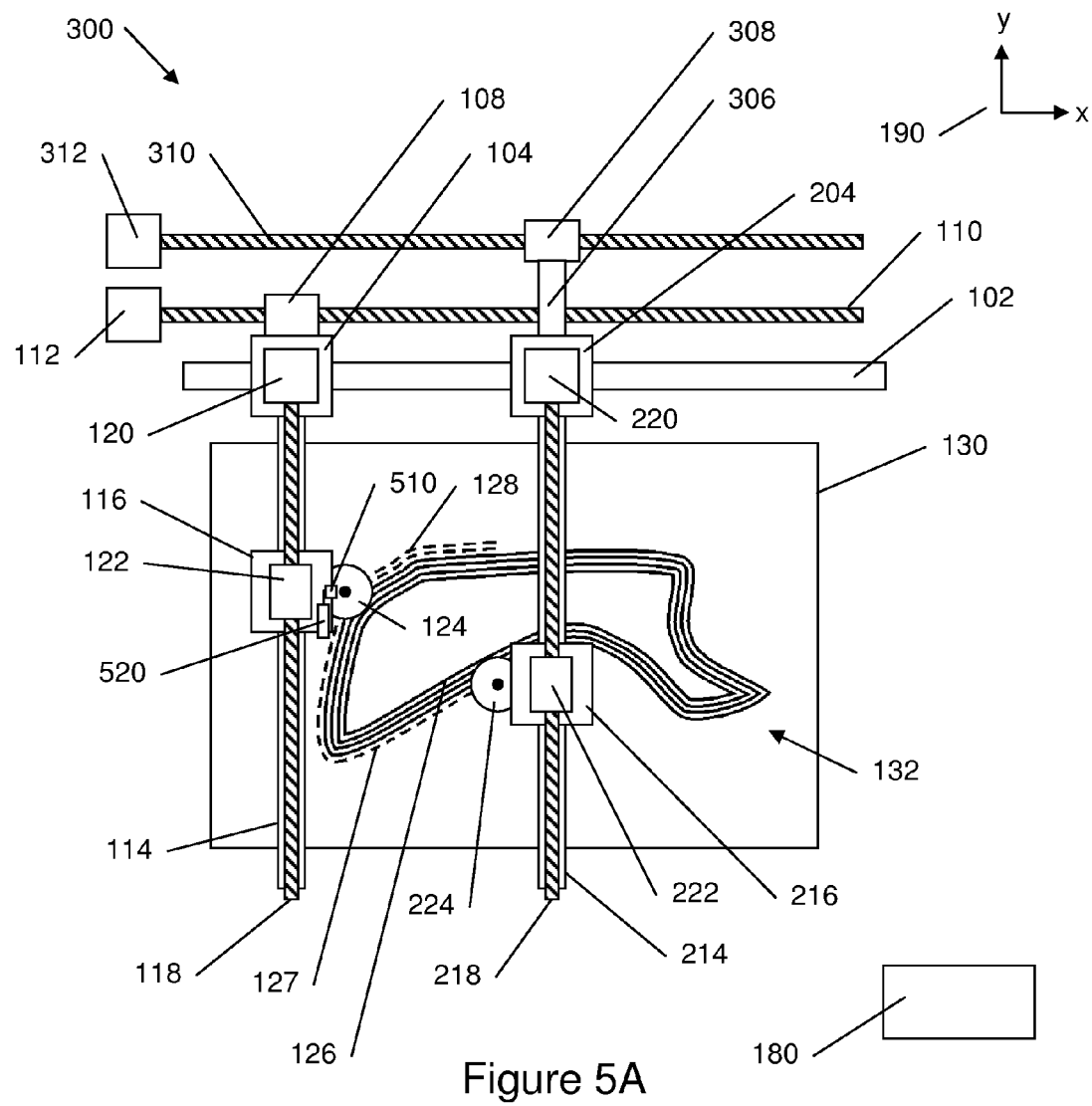
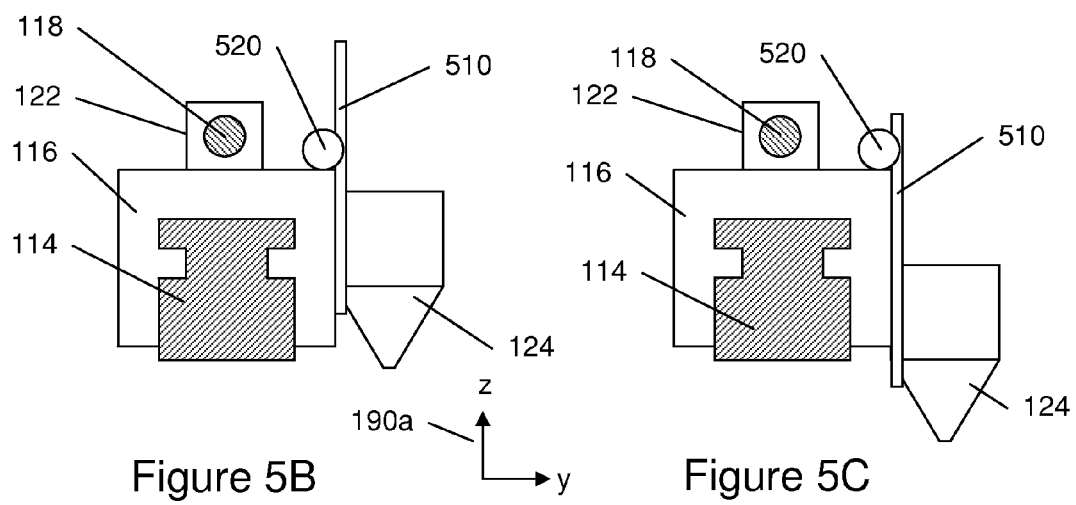
Figure 5A
Figure 5B
Figure 5C

ADDITIVE MANUFACTURING DEVICE

This application claims priority to and the benefit of U.S. provisional patent application No. 61/941,494 filed Feb. 19, 2014 the entire disclosure of which is herein incorporated by reference.

TECHNOLOGY FIELD

The apparatus and method are related to the field of additive manufacturing and particularly to process of making a three-dimensional solid object from a digital model.

BACKGROUND

Additive manufacturing devices usually use a single material dispensing or writing head to deposit and cure material in order to construct a solid object out of non-solid material. The writing head typically writes layer after layer, gradually adding object details to the object to build the three-dimensional (3D) object representation. One such example of additive manufacturing product is Mojo system, commercially available from Stratasys, Ltd., Edina, Minn., United States.

Additive manufacturing devices are characterized by utilizing a single material dispensing or writing element that can typically move in a plane to add a layer of the 3D object. Additional motion mechanism or actuation mechanism typically perpendicular to the plane where the added layers reside enables the device to add layers on-top of existing layers to build the 3D object. The time required to build a 3D object depends on various parameters, including the speed of adding a layer to the 3D object and other parameters such as for example, curing time of resin using UV radiation, the speed of adding solid material to the layer which depends on the material itself, the intensity of the curing agent and the desired resolution of the 3D object details.

It is the purpose of this disclosure to provide apparatus and methods that support faster 3D object manufacturing in spite of the speed limitation of writing heads and different other technologies.

GLOSSARY

Additive manufacturing—Additive manufacturing is a process of making a three-dimensional solid object of virtually any shape from a digital model.

Writing—Any action of generating a solid-state material in a predetermined volume by technologies such as material dispensing or deposition, extrusion of material, sputtering, dripping (which are all special cases of material dispensing), granular materials binding, electron beam direct manufacturing and curing of resin.

Curing or solidifying radiation—as used in the current disclosure curing or solidifying radiation includes laser source and lenses for curing resin, a heat source, a UV source, a microwave source, electron beam source and other sources solidifying deposited/dispensed material.

3D object (also: object, three-dimensional object, solid object)—as used in the current disclosure means a body of material that is constructed using an additive manufacturing device.

Writing head or material dispensing head (also head)—The part in an apparatus that contains a writing element, for example, a nozzle or a plurality of nozzles and supports the writing function of the writing head. A writing head or material dispensing head can be of a fixed writing speed where the amount of material added to a 3D object per writing length unit is constant. A writing head can be of a variable writing speed where the amount of material added to a 3D object per writing length unit is variable.

Segment—A continuous part of a layer of a 3D object assigned for writing by one writing or material dispensing head.

Segment group (also: group)—A group of at least one segment, all segments in the group belong to the same 3D object and are written by the same writing head or material dispensing head.

Similar—Two values are similar if one value is not more than 100% different from the other.

Cure (also: curing, curable, solidify, solidifying)—Any process, through which a non-solid material becomes solid, such as heating, cooling, chemical reaction and exposure to radiation.

Track—Any travel guiding object such as, a track, a rail, a screw, a path, a bar, a banister and a rod.

Layer—A part of a 3D object of a thickness written by one pass of a writing head and in a plane that is parallel to the material deposition plane. A layer is constructed from a set of segments that are written at the plane of the layer.

BRIEF SUMMARY

It is the purpose of this disclosure to provide apparatus and methods that support faster 3D objects manufacturing in spite of the speed limitation of writing or material dispensing heads and different other technologies.

Disclosed is an additive manufacturing apparatus compromising multiple independently driven writing heads. Typically the writing heads are utilized simultaneously and independently to write the same or different layers of a 3D object. As a result the time to write a layer is shorter than the time it takes with a single writing head with a similar throughput. The construction of the apparatus supports spatial manipulation of the multiple writing heads. The disclosure also provides methods that are implemented in such apparatus, to plan and control the typically simultaneous operation of the multiple writing heads. The methods also provide for situations that only some of the multiple writing heads are writing onto the 3D object in a given time.

BRIEF DESCRIPTION OF THE DRAWINGS

The apparatus and method will be better understood in reference to the following Figures:

FIG. 5A is an example of an apparatus, illustrating writing heads that can move in the direction of Z axis, perpendicular to the plane in which the material layers reside;

FIG. 5B is an example of an apparatus with writing heads that can move in the direction of Z axis, perpendicular to the plane in which the material layers reside;

FIG. 5C is an example of an apparatus, with writing heads that can move in the direction of Z axis, perpendicular to the plane in which the material layers reside;

DETAILED DESCRIPTION OF EXEMPLARY EMBODIMENTS

The present disclosure uses material dispensing or writing heads as an example of additive manufacturing process. It should be appreciated that this is made only by way of example and does not limit the scope of the disclosure to this particular technique. The disclosure is analogues when using other technologies such as: resin curing, bottom-up building of a 3D object as well as top-down building technology, with writing heads located above the 3D object or with writing heads located below the 3D object, any other action of generating a solid-state material in a predetermined volume by technologies such as material dispensing or deposition, extrusion of material, sputtering, dripping (which are special cases of material dispensing), granular materials binding, electron beam direct manufacturing, solidifying deposited/dispensed material, material solidifying, dispensed by nozzle or orifice or spattered material and curing of resin.

Figure 1:
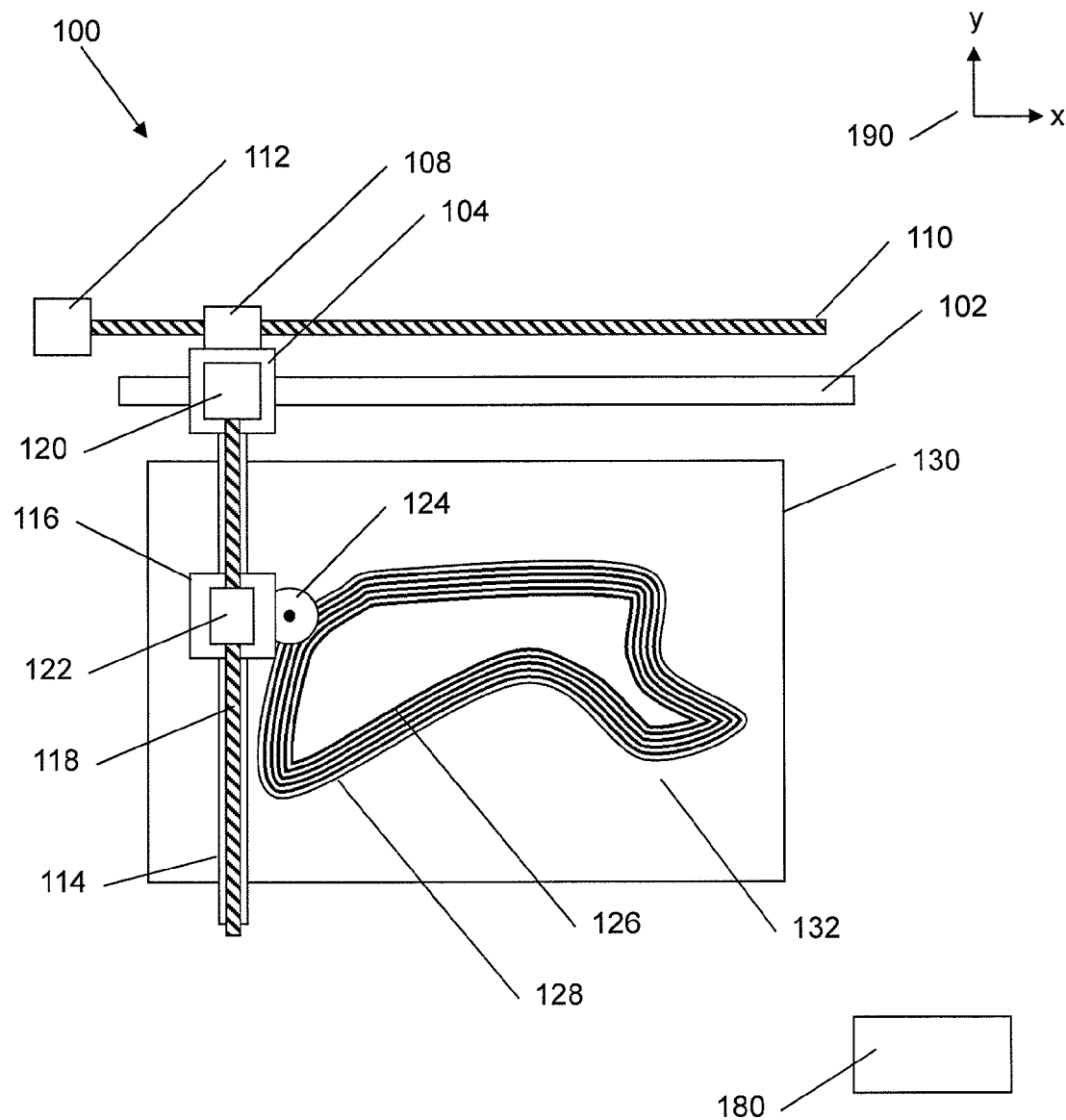
FIG. 1 is a simplified illustration of an example of a state of the art additive manufacturing apparatus.

Reference is made now to FIG. 1 which presents a top view of a typical layout of a current known in the art additive manufacturing device 100. Reference coordinate system is indicated by reference numeral 190.

Writing head 124 is mounted on an actuation mechanism comprising carriage 116 to which writing head 124 is connected. Carriage 116 is configured to slide along track 114. The actuation mechanism comprises also motor 120 that is mounted on carriage 104 and drives screw 118 that is configured to move nut 122 connected to carriage 116. When motor 120 is activated it rotates screw 118 and imparts movement on carriage 116 and the assembly associated with carriage 116 along track 114. By controlling motor 120, computer 180 can issue a command to move writing head 124 along track 114 in the direction of the Y axis at different speeds and accuracy.

The actuation mechanism of writing head 124 comprises also a track 102 with carriage 104 that can move in the direction of X axis. Nut 108 is connected to carriage 104 and could be driven by screw 110 that is connected to motor 112 controlled by computer 180 and configured to move head 124 in the direction of X axis.

In another example of the apparatus numerals 108 and 110 mark a non-captive linear actuator where 108 is the motor and screw 110 is fastened to a fixed element 112 or any other linear actuator. Other known linear motion actuators could be employed to impart movement on writing or material dispensing head 124.

Connection of computer 180, typically through motion controllers and motor drivers are not shown to simplify the drawings and since this is a technology known in the art. Computer 180 is also configured to plan (or generate) and control at least one travel trajectory and at least one material dispensing function of at least one material dispensing or writing head, for example head 124.

Plate 130 provides the support to the 3D object 132 that is under construction. Plate 130 could provide one support plane for the 3D object being manufactured, although it could provide multiple relieved support planes to support different parts of the 3D object to be manufactured. Plate 130 could move in direction of Z axis, perpendicular to the plane of the plate to allow for the different layers to be written to be located at a suitable distance in Z direction from the writing elements. First layer 126 is in contact with plate 130 and is the lowest layer. Layer 128, in this example, is the $6^{th}$ (sixth) layer in the 3D object writing process and it is currently the most upper layer of the 3D object and it is currently being written. In FIG. 1 writing head 124 is writing layer 128 and other layers at a writing rate typical to apparatus 100. The time to complete layer 128 by apparatus 100 is denoted T(6). The time to complete layer i with a single writing head will be denoted T(i).

Figure 2A:
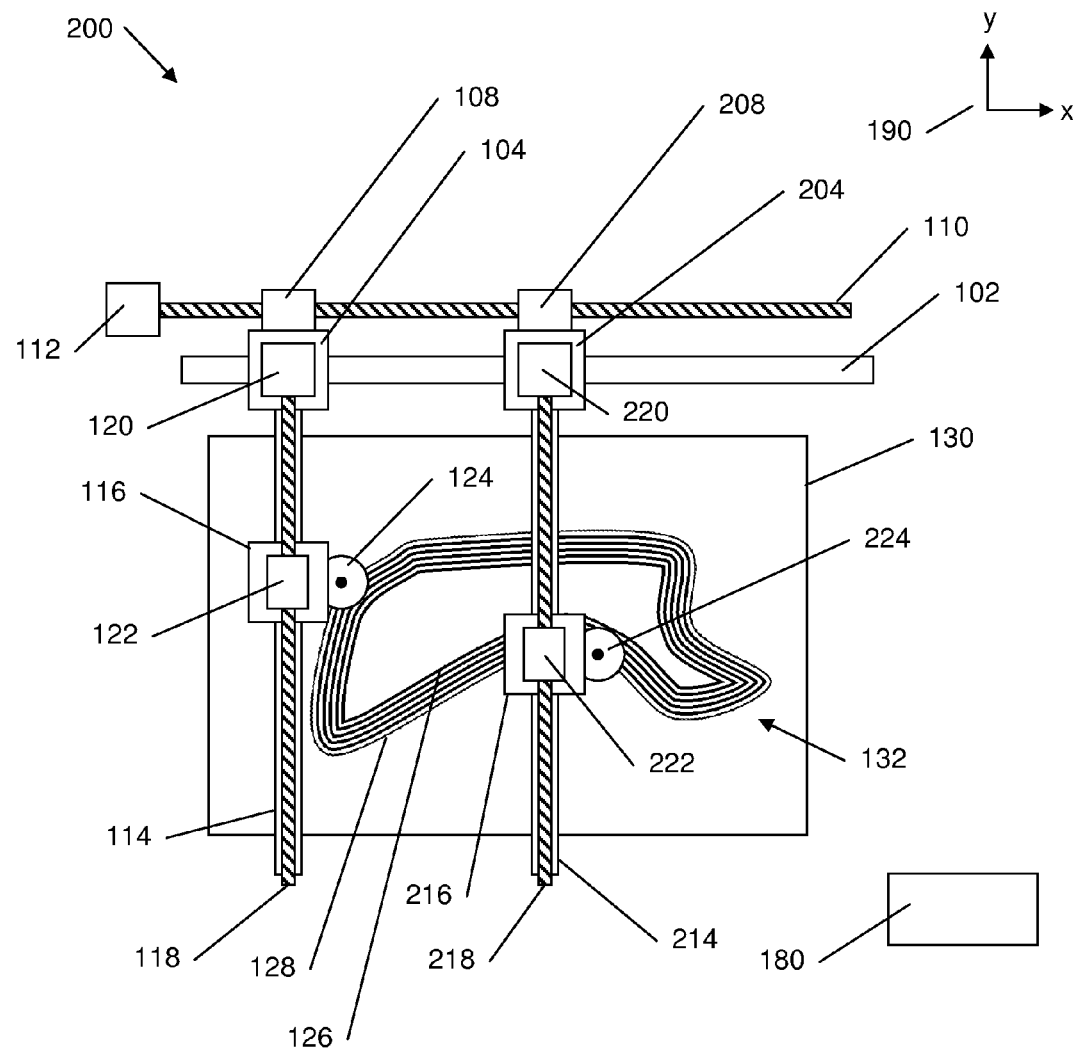
FIG. 2A is an example of an apparatus demonstrating two partially coupled writing heads.

An example of the apparatus according to the present disclosure is illustrated in FIG. 2A. FIG. 2A illustrates apparatus 200 comprising two material dispensing or writing heads configured to write layers to construct or build at least one 3D object and an actuation mechanism configured to move each material dispensing or writing head relative to a support 130 of the 3D object. Apparatus 200 is illustrated at a phase of writing layer 128 (the description for other layers is analog). An assembly carrying writing head 224 was added to provide an apparatus with a second writing head. Since nut 208 is assembled on the same screw 110 as does nut 108, both writing heads 124 and 224 could be moved along the X axis by screw 110 while the distance between the writing heads 124 and 224 in the direction of X axis is fixed. Each writing head 124 and 224 could also move along the Y axis independently of the other. The actuation mechanism is also configured to move the two material dispensing/writing heads 124 and 224 simultaneously, for at least a part of the material dispensing/writing function.

With this arrangement writing heads 124 and 224 can write (dispense material in this example) at least a part of separate segments of layer 128 (or any other layer) simultaneously. With appropriate design of segment groups and their assignments to writing head 124 and 224, each writing head could be assigned or allocated to write similar portion of length of the total segments length of layer 128 (or any other layer). Therefore, the time to complete layer 128 with the two writing heads of similar throughput could be reduced up to half of the time T(6)/2 required to complete layer 128 with one writing head.

Figures 2B, 2C:
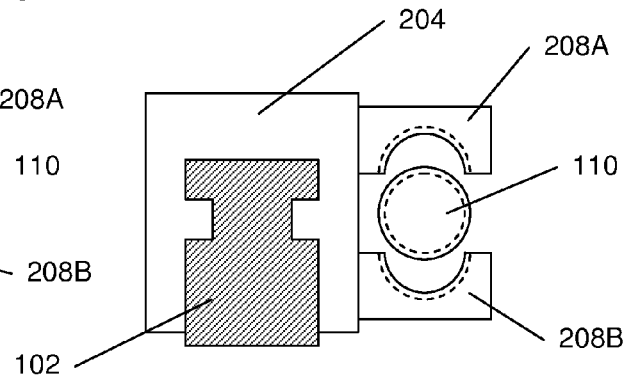
FIG. 2B is side view of a nut and screw engagement of the apparatus of FIG. 2A.
FIG. 2C is a side view of the nut and screw of FIG. 2B, but shown with two parts of the nut in a separated position.

A proper design of sharing the layer segments between the two writing heads depends on the distance along X axis direction between the writing heads relative to the size of the 3D object to be written. A mechanism, for example, such as shown in reference to nut 208, could be provided for adjustment of the distance between the writing heads along X-axis direction. In FIG. 2B nut 208 is shown as observed from the direction of X axis that is also track 102 direction. Nut 208 is split into an upper half 208A and a lower half 208B. Both parts are connected in FIG. 2B such that they could close on screw 110. When screw 110 stands still, nut 208 does not move and so is carriage 204 that is connected to nut 208. In FIG. 2C the two parts of nut 208 are separated by moving part 208A up and part 208B down. Carriage 204 is now released from screw 110 and therefore carriage 204 can be moved along track 102 to adjust the distance between writing heads 124 and 224 along the X direction (track 102 direction), according to the dimensions of the 3D object being manufactured. Typically the distance would be adjusted to a distance that is about half of the dimension of the 3D object in the direction of the X-axis. Than parts 208A and 208B of the nut could be closed as shown in FIG. 2B and the distance between the writing heads 124 and 224 is set.

In some examples it could be desired to construct a limiting device that would set a minimal distance between nuts 108 and 208 so that elements associated with the assembly of writing head 124 (such as carriage 116, nut 122 and writing head 124) will not collide with elements associated with the assembly of writing head 224 (such as carriage 216, nut 222, and writing head 224). This could be done, for example, by a limiting tube (not shown in the figures) into which screw 110 is inserted, the tube could be located on the screw between nuts 108 and 208 and be of the length that prevents nuts 108 and 208 getting too close to each other during adjustment of the distance between writing heads 124 and 224. With such a minimal distance limiting device/tube writing heads 124 and 224 could be secured from possible collision.

The coupling of writing heads 124 and 224 in the direction of X axis imposes some limitations on moving speeds of the writing heads and in some cases the writing heads could not move at the same speed, each relative to its own segment. An example of such a case is when writing head 124 is writing a section of a segment that is in the direction of Y axis and, at this time, writing head 224 is facing a section of a segment that is in the direction of X axis. Since the writing heads 124 and 224 are coupled in the direction of X-axis, writing head 224 does not move along its segment section in the direction of X axis until writing head 124 completes its respective segment section that is in the direction of Y-axis. To overcome this limitation material dispensing by writing head 224 could be held off until writing head 124 is ready to move in the direction of X axis. This could be implemented by using a variable writing speed (For example, the amount of material added to a 3D object per writing length unit could be variable.) for at least one of the two writing heads 124 and 224. Alternatively, planning of the writing trajectories and segments could be done such as to minimize situations where the sections to be written at a given time are perpendicular to each other. This could help to avoid situations where one material dispensing head has to stop material extrusion in one direction until the other writing head completes its material extrusion in a perpendicular direction.

In a further example the coupling of between two writing heads could be removed or reduced in the direction of X axis.

In one example of the apparatus, variable writing speed writing heads can be used so to adjust the writing speed (such as the rate of material extrusion in material extrusion technique or the intensity of the curing radiation in a resin curing technique) of at least one of the writing or material dispensing heads.

Planning the writing could be aimed to minimize situations where the sections to be written at a given time are perpendicular to each other and it could be also used to achieve higher average writing speed from the two writing heads, to reduce a layer i writing time below T(i) as much as possible.

It would be appreciated that more than two writing heads can be assembled on track 102 to share the writing of a 3D object layer, for example, layer 6 below T(6)/2. The writing time could be reduced to T(6)/n where n is the number of writing heads installed. By planning segment groups so that the time to complete writing of the different segment groups is similar, the time to write the layer can be minimized.

Decoupling of writing heads 124 and 224 using the same structure of a single track and a single screw as shown in FIG. 2A could be done by using non-captive linear actuators. For example, motor 112 could be removed and screw 110 could be fixed to avoid rotation. Nuts 108 and 208 could be replaced with non-captive linear actuators. Each of the non-captive linear actuators is controlled by computer 180 independent of the other and therefore computer 108 can control the distance between writing heads 124 and 224 along the X axis direction and change it as it could be desired during the writing process or during any other time. It would be appreciated that other solutions can be used to get independent motion of writing heads 124 and 224 along the direction of X axis such as replacing screw 110 with a rack and pinion system. A motor could be attached to carriages 104 and 204 and they drive and move heads 124 and 224 independently on a guide along the direction of X axis. In another example, the rack can be an integral part of track 102 so that one part constitutes both the track and the rack and there is no need for additional part such as screw 110 or a rack that is separated from the track.

Figure 3:
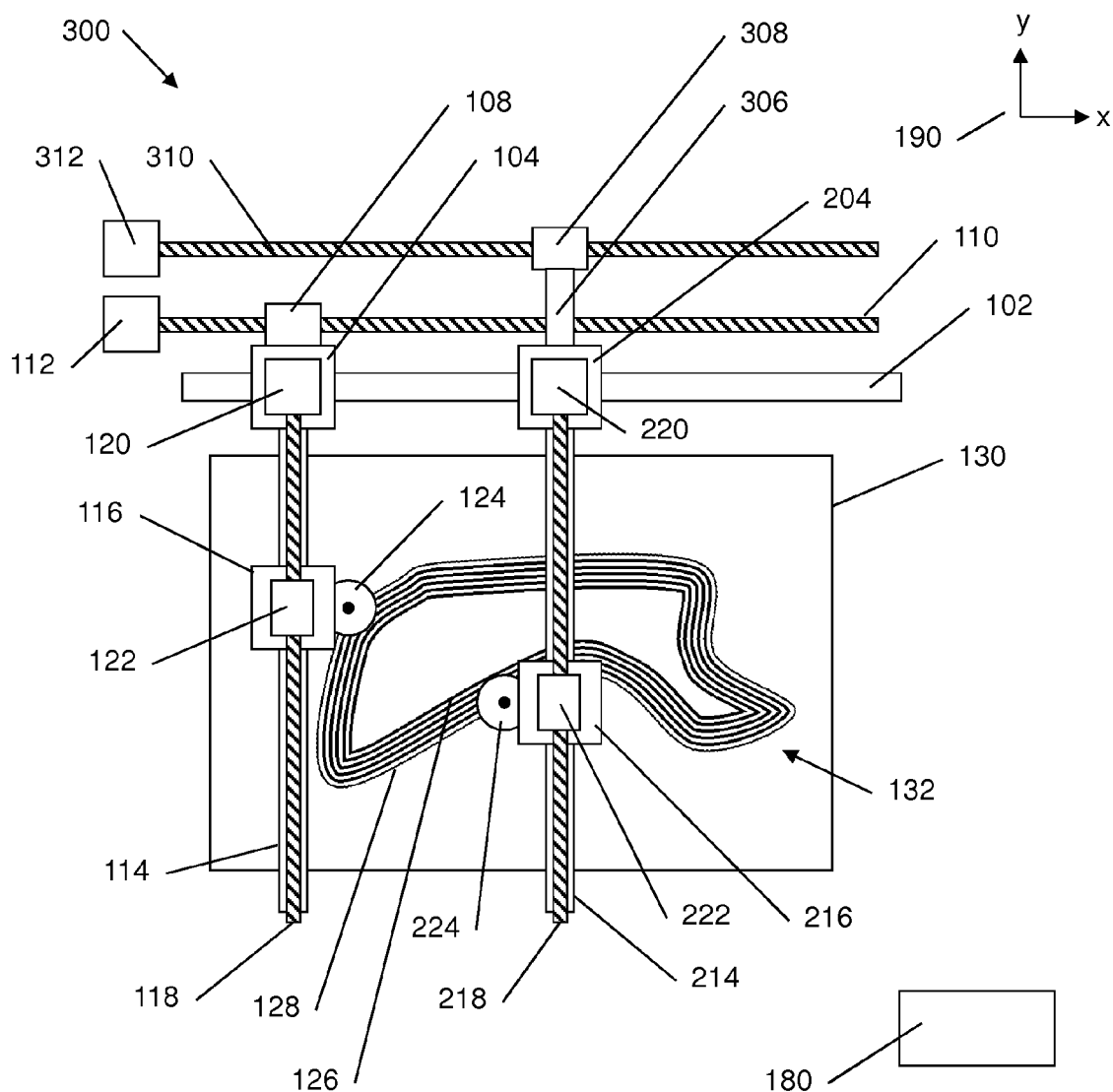
FIG. 3 is an example of an apparatus demonstrating an example of two uncoupled writing heads.

FIG. 3 is an example of an apparatus where the two writing heads 124 and 224 are not coupled and each writing head can move in any direction independently of the other (as long as collision is avoided between the writing heads or other parts of the apparatus).

Writing head 224 assembly could be attached to the same track 102 as writing head 124 although it could have a separate actuation mechanism. In this example carriage 204 is connected to nut 308 via bridge 204. Nut 308 is coupled to screw 310 that is driven by motor 312.

With this arrangement writing heads 124 and 224 can move independently in x-y plan as long as the distance between them is above a minimum distance depending on the specific design of the apparatus and specific relative position of the two writing heads. With this arrangement also the two writing heads can write sections of segments that are perpendicular to each other, each writing head at a full writing speed. This provides more flexibility in the planning of the layer i writing to achieve shorter writing times, closer to T(i)/2 as compared to the example of FIG. 2A.

In the example of FIG. 3 writing or material dispensing head 224 is assembled on the left side of carriage 216 to support closer distances between the writing heads relative to the example of FIG. 2A and support better writing time optimization in the planning of writing of a layer, head 224 could also be assembled on the right side of carriage 216. Such a consideration may change when additional writing heads are added to the apparatus.

Figure 4:
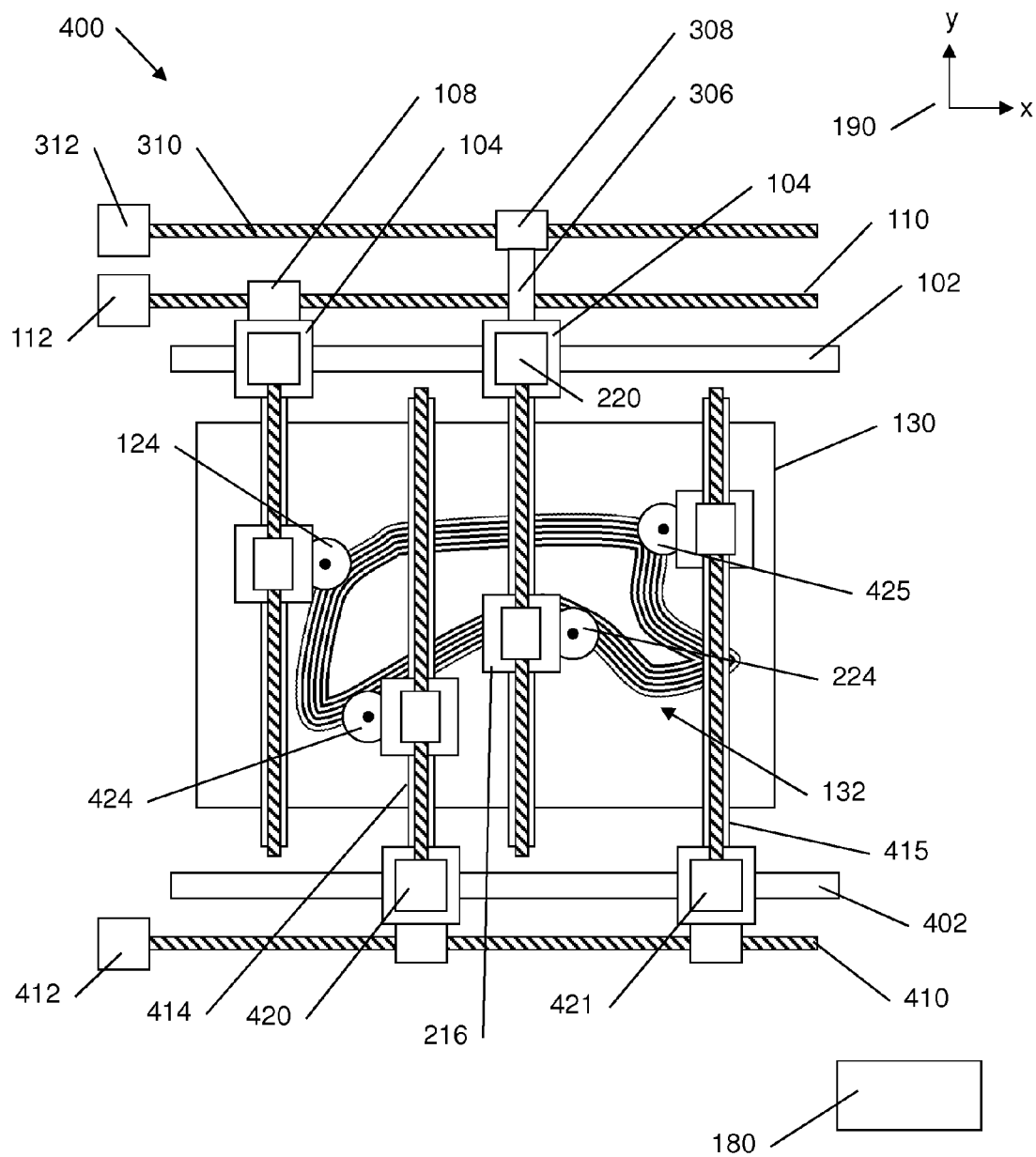
FIG. 4 is an example of an apparatus, including four writing heads, of which two writing heads are partially coupled writing heads and two writing heads are uncoupled writing heads.

FIG. 4 is an example of the apparatus with four writing heads. FIG. 4 presents two writing heads (124 and 224) that are uncoupled as in the example of FIG. 3 (in this example writing head 224 is assembled on the right side of carriage 216) and two writing heads (420 and 421) that are coupled through screw 410, in the same way as it was shown in the example of FIG. 2A. In the current example each of writing heads 124 and 224 can move independently of each other writing head and writing heads 224 and 225 could move independently of writing heads 124 and 224. Writing heads 224 and 225 could move independently of each other in the direction of Y axis while in the direction of X axis they are coupled through screw 410.

It would be appreciated that the example of FIG. 4 is provided to emphasize the flexibility of the implementation of the apparatus and that any number of the writing heads could be implemented as coupled or uncoupled. For example, instead of adding writing or material dispensing heads 424 and 425 with one screw 410, assembly these writing heads could be made with a dual screw assembly similar to writing heads 124 and 224 to provide an implementation where each of the four writing heads could move independently of the other 3 writing heads. The present disclosure is not limited to any of these specific implementations and to the number of writing heads in this example.

In an example of FIGS. 5A, 5B and 5C at least one writing head has a motion capability in direction of Z axis. This example is described in reference to the apparatus of FIG. 3 although it would be appreciated that it is not limited to the apparatus of FIG. 3 and it is fully applicable to any of the examples shown in this description.

As explained in more details in reference to FIGS. 5B and 5C, writing head 124 could move in the direction of the Z axis. In FIG. 5B a cross section of track 114 is shown, with carriage 116 and cross section of driving screw 118. Writing head 124 is connected to carriage 116 via slider 510 and motor 520 is controlled by computer 180 and is configured to move slider 510 in direction of Z axis (see coordinate system 190a) and thereby, move writing head 124 in direction of Z axis.

With this arrangement the apparatus of FIG. 5A could be used to write more than one layer at a time. In the example of FIG. 5A, four layers are shown to have been written already, the first layer is denoted by reference numeral 126. In this example, about half of layer 127 (left side, shown by a broken line) has been written by writing head 224. While writing head 224 is writing layer 127, writing head 124 positioned at a distance of one layer in Z axis direction, above the layer written by writing head 224 and it is writing layer 128 on top of the already written layer 127. FIG. 5C shows an example of writing head 124 at another position along the Z axis relative to the position of writing head 124 in FIG. 5B.

It would be appreciated that layers separation (in Z axis direction) between writing heads are not limited to one layer and any separation distance between writing heads in the Z direction could be used.

Figure 5D:
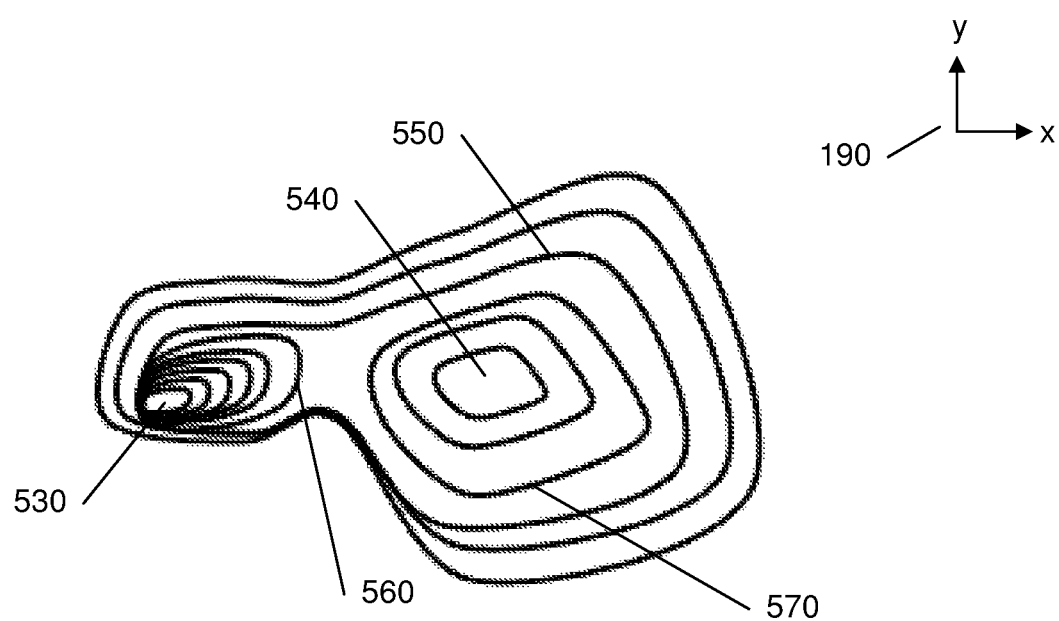
FIG. 5D is an example of writing plan for an apparatus utilizing writing heads that can move in the direction of Z axis, perpendicular to the plane in which the material layers reside.

In the example illustrated in FIG. 5D double peak 3D object is shown with peaks 530 and 540. The last layer before splitting into two unconnected layer segments 560 and 570 is layer 550. Following layer 550 writing, writing head 124 can be assigned to write the layers of left peak 530 starting for example by layer 560. Peak 530 writing is characterized by many layers of a shorter length comparing to peak 540 that has fewer layers of longer length. At the same time, writing head 224 can be assigned to write (dispense material in this example) peak 540 that is constructed of a few long contours. Since writing head 124 will complete each of its layers in a shorter time than writing head 224, due to the motion capability in the Z direction, writing head 124 can move to a layer that is higher along the Z direction while writing head 224 is still engaged in writing a layer at a lower height along the Z direction. Over time, during the writing process, the separation between writing head 124 and writing head 224 in the Z axis direction could be of multiple layers thickness. Overall writing time is shortened since writing head 124 does not need to wait for writing head 224 to complete writing of allocated to it long contour.

With more than 2 writing heads, a larger number of layer differences settings can be used between the various writing heads.

Multiple writing heads of the present apparatus could be operated so to reduce the time to write a 3D object. A variety of methods can be implemented to work with the present apparatus to schedule the writing of different segments at a variety of times so as to minimize the writing time of the 3D object. Considerations could include layers shapes, layers lengths, mechanical constrain and performance characteristics of any specific apparatus that is constructed according to the present disclosure. Examples of such methods are described below.

Figure 6A:
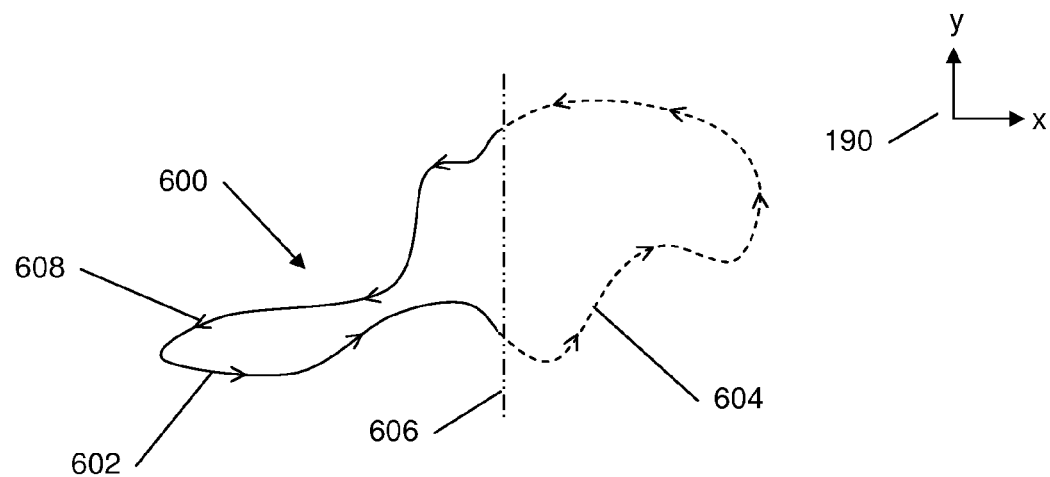
FIG. 6A is an example of a contour of a layer split into two segments groups.

Reference is made to FIG. 6A which is an example of an apparatus according to the current disclosure providing an example of designing a writing sequence by the present apparatus with two writing heads. Description of such writing or material deposition planning is made in reference to one layer with all segments written in the description belong to the same layer. The drawing of the apparatus have been omitted in FIG. 6A to keep the figure clear and only contours, similar to those of FIGS. 1-5D are shown (such as contour 126 of FIG. 5A). In other figures partial elements of the apparatus samples of FIGS. 1-5D may be added for clarification, with possible changes as required for the description clarity.

In FIG. 6A, layer 600 is split into 2 segment groups, one group contains segment 602 and the other group contains segment 604. The split, as made by split-line 606 that is parallel to Y axis, is in a location that makes the length of segment 602 similar to the length of segment 604. Arrow heads, one of them is indicated by numerical indicator 608, point at the direction of writing head movement on the particular segment. In this example the planning of the writing is made so that the material dispensing start points of at least two writing heads are separated along a similar direction (the X axis direction in this example) and at intermediate material dispensing points are separated along another direction (the Y direction in this example).

Figure 6B:
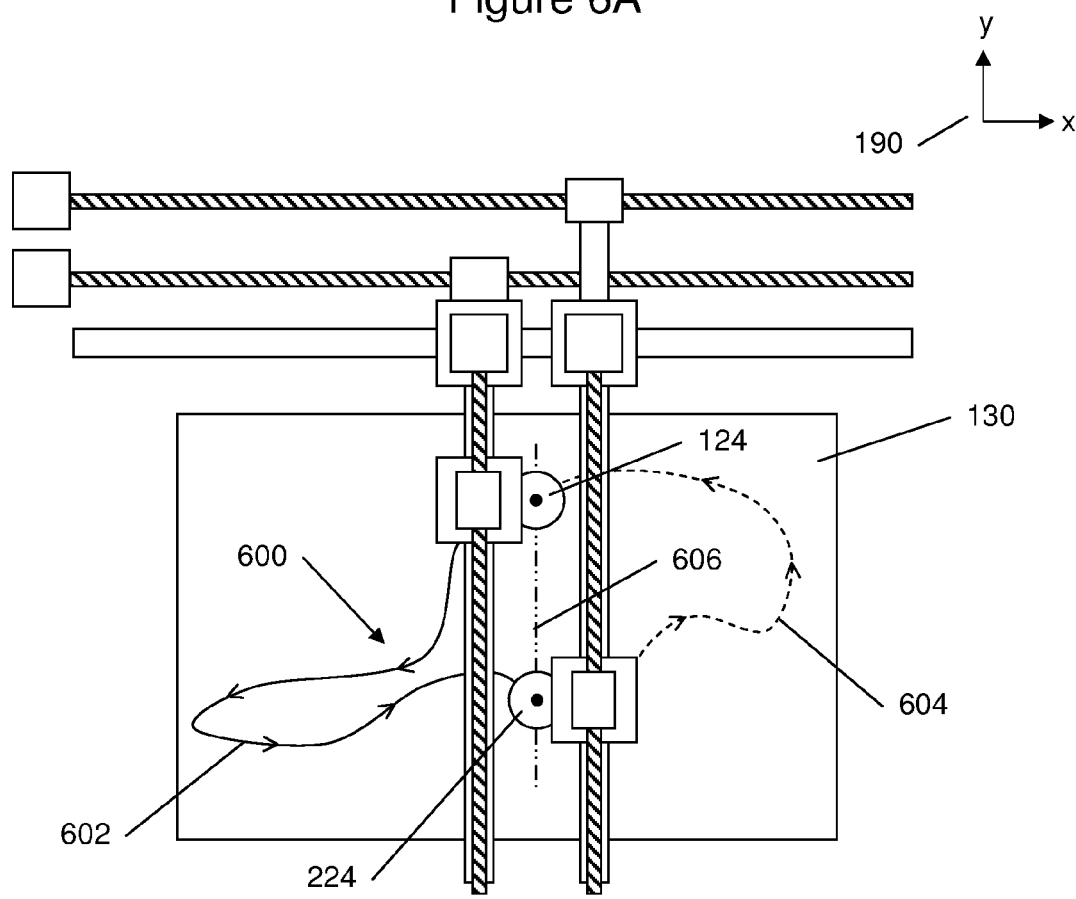
FIG. 6B is an example of an apparatus according to the current disclosure at a first writing position of the segments of FIG. 6A.

FIG. 6B illustrates an example of the starting points for writing layer 600. Writing head 124 is positioned at the beginning of segment 602 and writing head 224 is positioned at the beginning of segment 604. Both writing heads could start writing the respective segments in direction indicated by the arrow heads.

Typically, both writing heads will start at the same time but this is not a limitation of the apparatus. In some cases, mechanical constrains or other considerations could affect the writing time. One writing head might get into its starting position at a certain time $t_1$ and start writing at a suitable time $t_2$ and the other writing head might get into its starting position at a time $t_3$ and start writing at a time $t_4$. Any relations might be planned between $t_1$, $t_2$, $t_3$ and $t_4$. For example: $t_1=t_2=t_3=t_4$, or $t_1=t_2<t_3<t_4$, or $t_1<t_2=t_3<t_4$ or $t_1=t_2<t_3=t_4$ or $t_1=t_2>t_3=t_4$ or $t_1<t_2>t_3=t_4$.

Figure 6C:
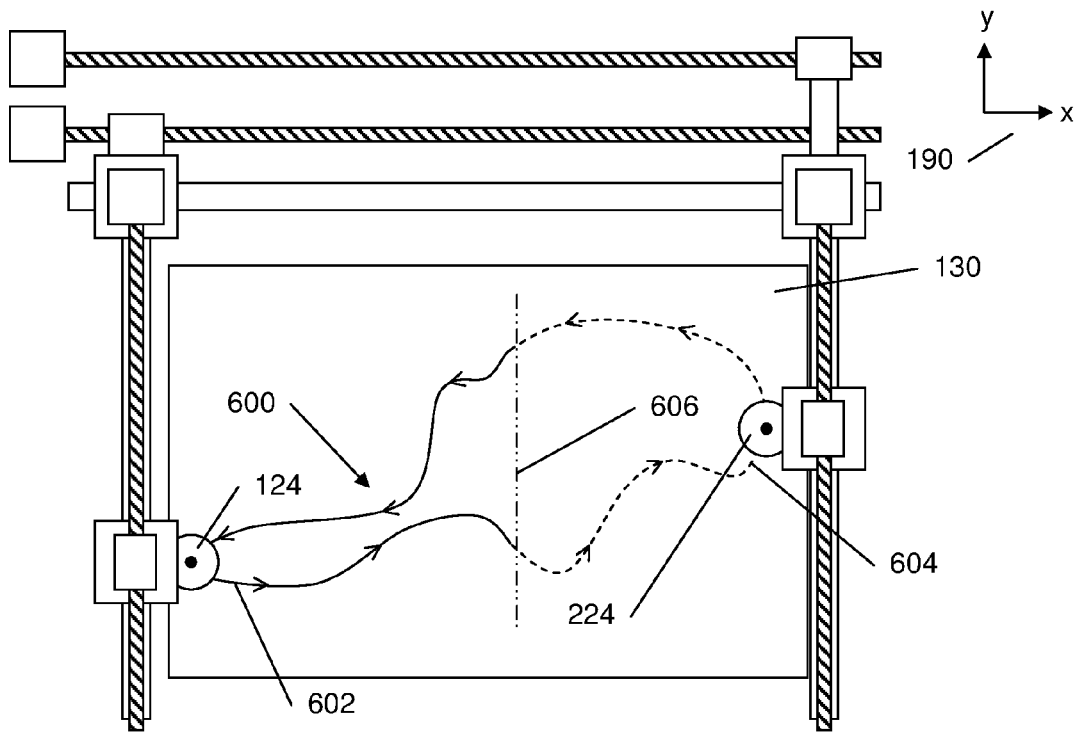
FIG. 6C is an example of an apparatus according to the current disclosure at a second writing position of the segments of FIG. 6A.
Figure 6D:
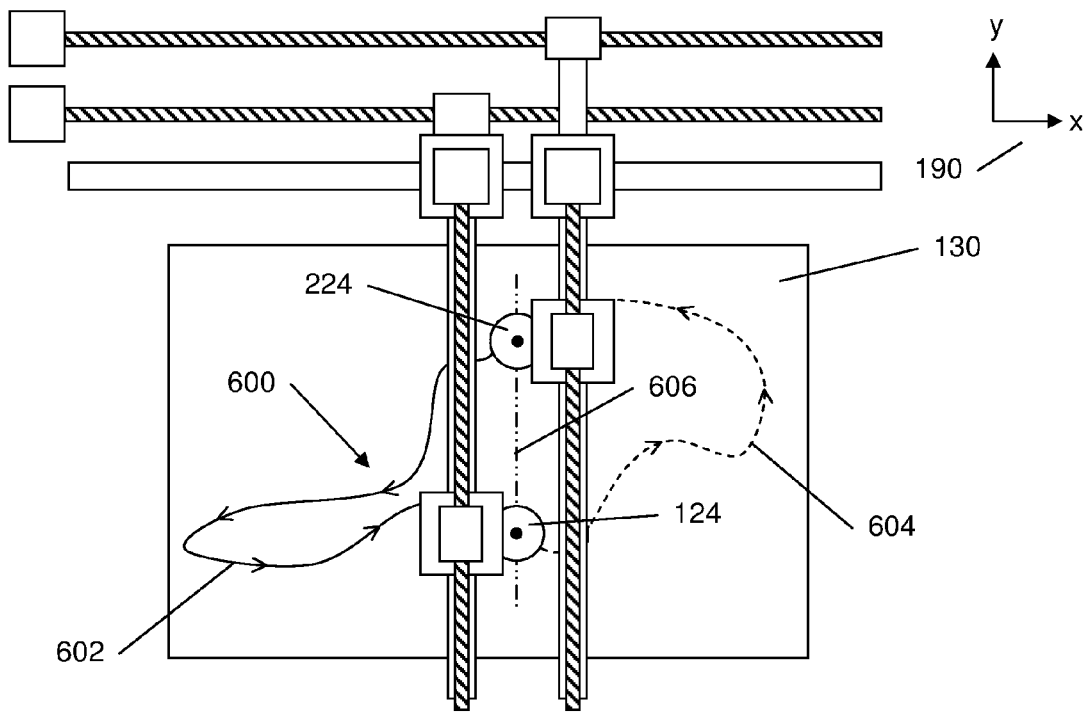
FIG. 6D is an example of an apparatus according to the current disclosure at a third writing position of the segment of FIG. 6A.

In the example, of FIG. 6B, writing head 124 is positioned at the beginning of segment 602 at $t_1$ and starts writing segment 602 at $t_2$ in the direction of the arrow heads of segment 602. Writing head 224 is positioned at the beginning of segment 604 at $t_3$ and starts writing segment 604 at $t_4$ in the direction of the arrow heads of segment 604. In this example, the times were selected to be $t_1=t_2=t_3=t_4$. Therefore writing heads 124 and 224 start writing segments 602 and 604 simultaneously and, assuming they write at the same speed and the segments are of a similar length, they reach the point of completing half a segment each at a similar time as shown in FIG. 6C. As shown in FIG. 6D, each writing head completes its respective segment, at a similar time as the other writing head. In FIG. 6D writing head 124 completed the writing at the starting point of writing head 224 and writing head 224 ended the writing at the starting point of writing head 124. In this example, the trajectory of writing heads 124 and 224 was planned to prevent collision between the two writing heads by starting with a separation along the Y axis direction between the writing heads when the separation in the X direction is small (FIG. 6B), than as the writing heads move apart along the X direction they can move freely in the Y direction as shown in FIG. 6C. Separation along the Y direction is planned again in FIG. 6D when the two writing heads get closer again along the X direction.

In this example, the time of writing layer 600 by writing heads 124 and 224 as described will take about half the time it will take to write layer 600 by one writing head.

It would be appreciated that using additional writing heads, one such example for 4 writing heads described in FIG. 4, could further reduce the writing time of layer 600.

Figure 7A:
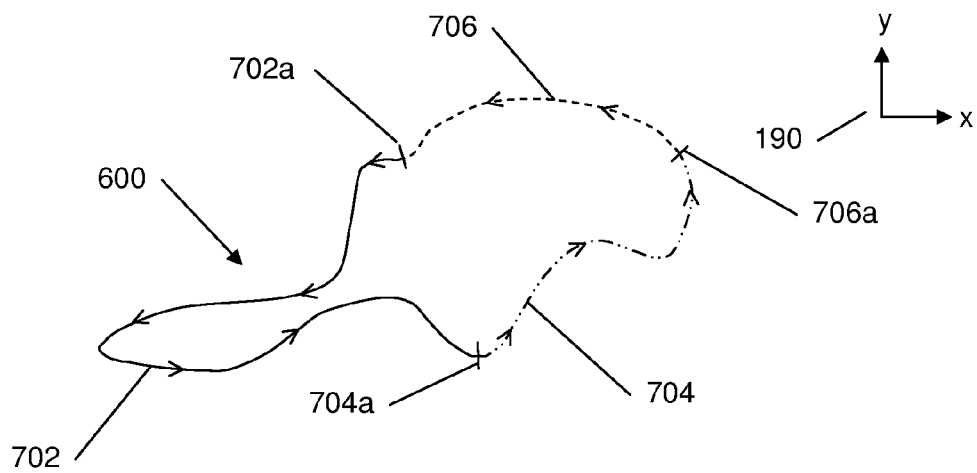
FIG. 7A is an example of a contour of a layer split into three segments.

It would also be appreciated that the starting point of segments 602 and 604 do not have to be at the same X coordinate as in the example of FIG. 6A shown along line 606. The starting points and segment planning can be different to satisfy possible constrains and specific apparatus implementation. Such example is shown in FIG. 7A.

It is desired to plan the writing sequence so that writing heads 124 and 224 maintain a similar (or at least sufficient) distance from each other in X axis direction, at the time of writing layer 600. To support this requirement, layer 600 could be split into two segment groups, with each group assigned to a particular writing head. Writing head 124 is being assigned to a group of a segment 702 starting its movement at notch 702a and ends its movement at notch 704a. Writing head 224 is being assigned to a group containing two segments, segment 704 (starting at notch 404a and ending at notch 706a) and segment 706 (starting at notch 406a and ending at notch 702a).

Figure 7B:
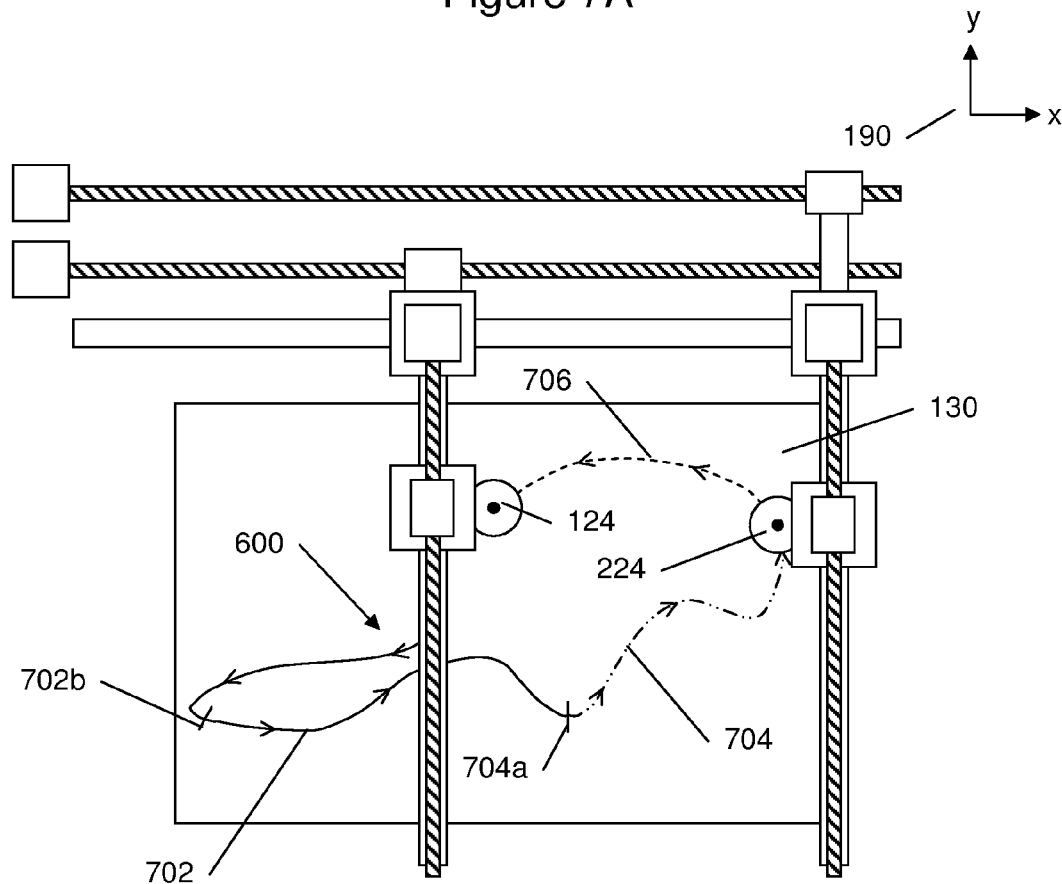
FIG. 7B is an example of an apparatus of the current disclosure at a first writing position of the segments of FIG. 7A.

The initial writing positions of writing heads 124 and 224 are illustrated in FIG. 7B. At the beginning, writing head 124 is positioned at the location of notch 702a and writing head 224 is positioned at the location of notch 706a. This way writing heads 124 and 224 are separated at about half the 3D object dimension along the direction of X axis. When writing of layer 600 starts, writing head 124 writes in direction of the arrow heads of segment 702 and writing head 224 writes in direction of the arrow heads of segment 706. When writing head 224 reaches the end of segment 706 (at about the location of notch 702a), writing head 124 reaches location 702b on segment 702. Writing head 224 could move to the beginning of segment 704, to the point of notch 704a, at a speed higher than the writing speed. During this time writing head 124 could continue writing segment 702 beyond point 702b or wait for writing head 224 to complete the movement from point 702a to point 704a. Overall writing speed considerations would prefer that writing head 124 will continue writing during this time. Some other constrains, such a mechanical structure, might suggest waiting. During this time writing head 124 is writing segment 702 from point 702b to point 704a, writing head 224 is writing segment 704 from point 704a to point 706a.

It would be appreciated that during the process of writing layer 600 writing heads 124 and 224 are well separated along the X axis direction.

In optimization for minimal writing time of the layer the segments will be also designed so that the writing time of segment 702 by writing head 124 will be equal or nearly equal to the time required for writing head 224 to write segment 706, move to the beginning of segment 704 and write segment 704.

It would be appreciated that the above methods could be used with more than two writing heads and that optimization could be made for time only (taking in account constrains of the specific implementation of the present apparatus) or optimization could be made for time including general approaches to keep writing heads generally as separated as possible during the layer writing time (as described in reference to FIG. 7A).

Figure 8A:
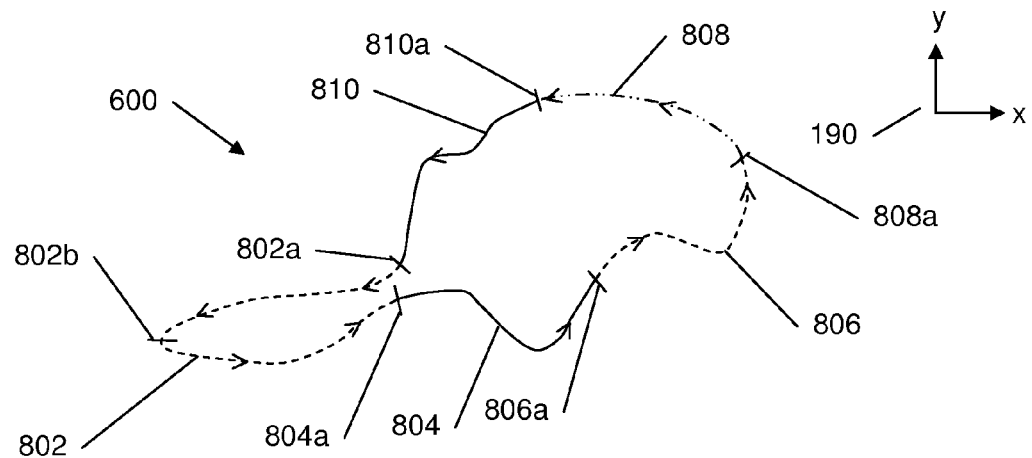
FIG. 8A is an example of a contour of a layer split into five segments.

FIG. 8A is an example of planning a writing sequence that takes advantage of an implementation of the present method in an apparatus having three writing heads. In this example the determination of the segment groups of a layer and material dispensing sequence is made so as to maintain the three material dispensing or writing heads at a similar distance, each from the neighboring material dispensing heads, along one direction, during the material dispensing of at least one segment by each material dispensing head.

Figure 8B:
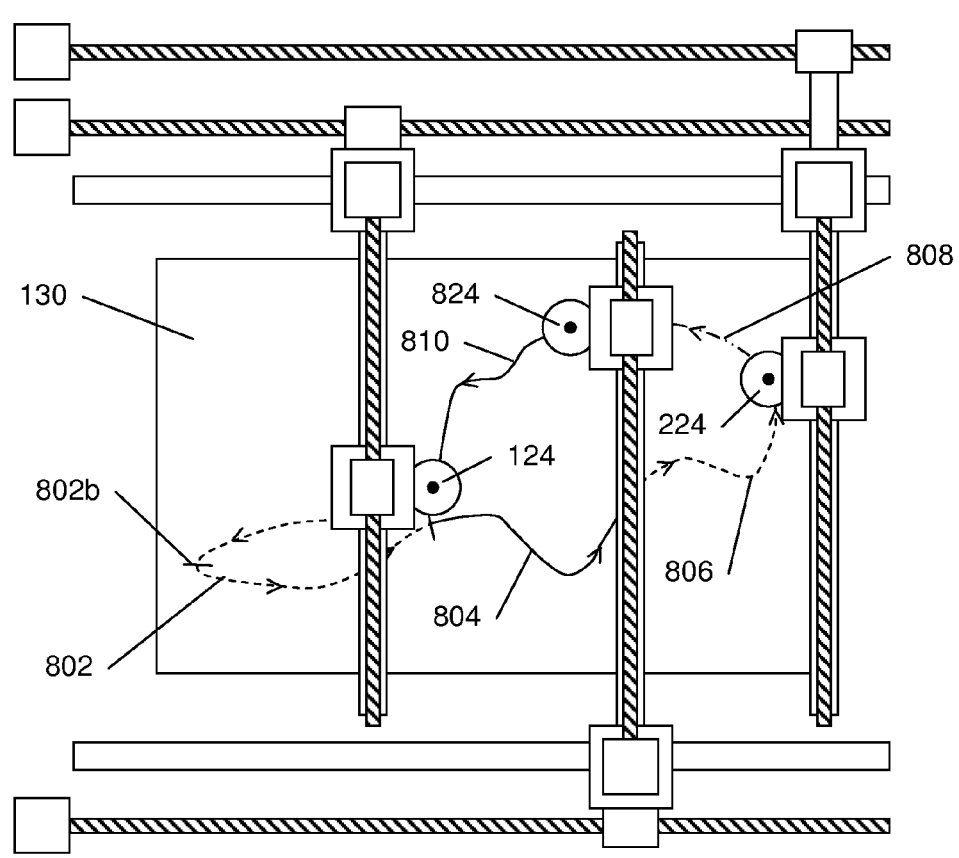
FIG. 8B is an example of an apparatus according to the current disclosure at a first writing position of the segments of FIG. 8A.

In FIG. 8A layer 600 is split into two segment groups, each group is assigned to one of three writing heads indicated as 124, 224 and 824 shown in FIG. 8B. The group containing the segment 802, assigned to be written by writing head 124. The group containing segments 804 and 810, assigned to be written by writing head 824. The group containing segments 806 and 808, assigned to be written by writing head 224. As explained in reference to FIGS. 7A and 7B, optimization of writing sequence is made both to minimize time and keep the three writing heads at a distance from each other during the writing process. The total length of each of the three segment groups is similar. For example, the sum of the lengths of segments 804 and 810 is similar to the sum of the lengths of segments 806 and 808. To start writing the three writing heads are positioned, each at the beginning of a segment of the respective segments group.

Writing head 224 is positioned at the beginning of segment 808, at point 808a, generally at the rightmost part of layer 600.

In one example, planning to prevent collision between the three writing heads and reduce writing time, writing head 824 is positioned at the beginning of segment 810, at point 810a, generally at a distance along the X axis that is about ⅓ of layer 600 dimension in the direction of X axis, left of the rightmost part of layer 600.

Writing head 124 is positioned at the beginning of segment 802, at point 802a, generally at a distance along X axis direction that is about ⅔ of layer 600 dimension in the direction of X axis, left of the rightmost part of layer 600.

This way the spaces between each two writing heads are similar.

The three writing heads could start now to write or deposit the material, each one at the relevant segment until writing head 224 reaches point 810a, writing head 824 reaches point 802a and writing head 124 gets near point 802b. At this stage writing head 224 moves at a faster pace from point 810a to point 806a so as to write the second segment 806 of the respective group. Writing head 124 moves at a faster pace from point 802a to point 804a so as to write the second segment 804 of the respective group. By this time, if the length of the segments is optimized properly, writing head 124 could reach point 802b and the three writing heads are ready to continue writing or material deposition. Writing head 224 could continue to write segment 806, writing head 824 could continue to write segment 804 and writing head 124 to complete segment 802.

As explained before, in this optimization for minimum time it takes to write layer 600, the optimization is made so that the time for writing head 224 to write segment 808, then move to the beginning of segment 806 and then to write segment 806 is similar the time for writing head 824 to write segment 810, then move to the beginning of segment 804 and then to write segment 804. The time is also similar to the time it takes writing head 124 to write segment 802. Also this example demonstrates a writing sequence that keeps the writing heads at a distance from each other during the writing process.

It would be appreciated that in all the examples above, the multiple writing heads apparatus can be used to write more than one 3D object at a time by assigning, for at least a part of the time, segments of different 3D objects to different writing heads.

It would be appreciated that in any of the above examples, discontinuing material deposition by one writing head while another material deposition or writing head keeps on depositing the material or writing, could be possible also to avoid collations between writing heads.

It would also be appreciated that in any of the above examples, one material deposition or writing head can be evacuated from the 3D object area while another material deposition writing head keeps on writing. This could be used to avoid collisions between writing heads.

It would be appreciated however, that the material deposition example description was made only by way of example and does not limit the scope of the disclosure to this technique. The disclosure is analogues in other technologies such as: resin curing, bottom-up building of a 3D object as well as top-down building technology, with writing heads located above the 3D object or with writing heads located below or at sides of the 3D object, any other action of generating a solid-state material in a predetermined volume by technologies such as material dispensing or deposition, extrusion of material, sputtering, dripping (which are all special cases of material dispensing), granular materials binding, electron beam direct manufacturing and curing of resin.

Figure 9A:
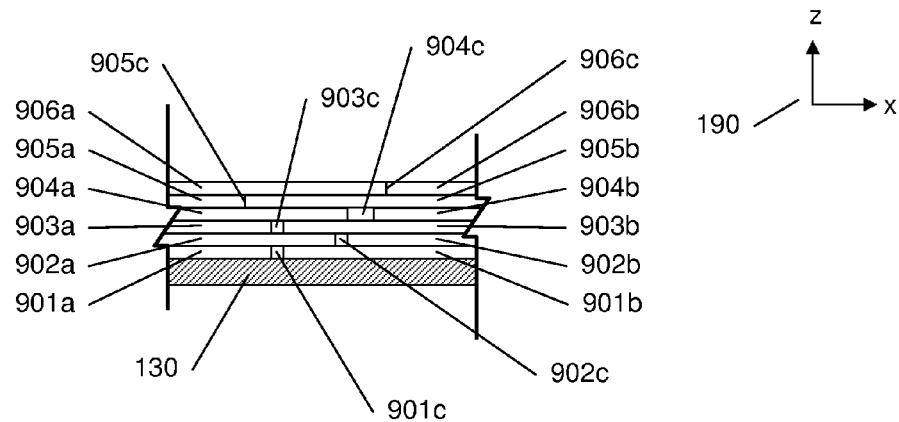
FIG. 9A is an example of a side view of meeting locations of different segments.

FIG. 9A is an example of a side view of a part of 6 layers of the 3D object, at a region where different segments meet. The layer that is in contact with plate 130 at this region includes 12 segments, including segments 901a and 901b. The location, where two segments 901a and 901b meet is denoted 901c. The location where two segments 902a and 902b meet is denoted 902c, and so on, up to the location where two segments 906a and 906b meet is denoted 906c. Coordinate system 190 indicates now the X and Z directions.

Throughout planning of the segment groups of the layers, the meeting locations of adjacent segments could be shifted relative to each other along the layer so as to avoid a situation where the segments meeting locations are on a continues curve and thus introducing a construction weakness in the contour of the 3D object. According to this, meeting location 902c is shifted relative to meeting location 901c, meeting location 903c is shifted relative to meeting location 902c and meeting location 904c is shifted relative to meeting location 903c and so on. Meeting locations of adjacent layers can be separated by a fixed or variable distance along the layers. The adjacent ends of segments of a layer could be planned to be located along the layer, as shown for example, in FIG. 9A.

The gap between two adjacent segments at the meeting location might be larger than zero as shown in the example of meeting locations 901c through 904c and the different segments may actually touch each other or be in a firm contact as shown in 905c and 906c. The gap between different segments could be variable as shown in meeting point 904c relative to 903c.

What characterizes this structure is that, at the near vicinity of the meeting point of each layer, the segments cross section characteristics is similar to that of the segment parts that are further away from the meeting point and it is actually similar to the segment cross section characteristics throughout the segment. The cross section characteristics of the segment are similar from one end of the segment to the other end.

Figure 9B:
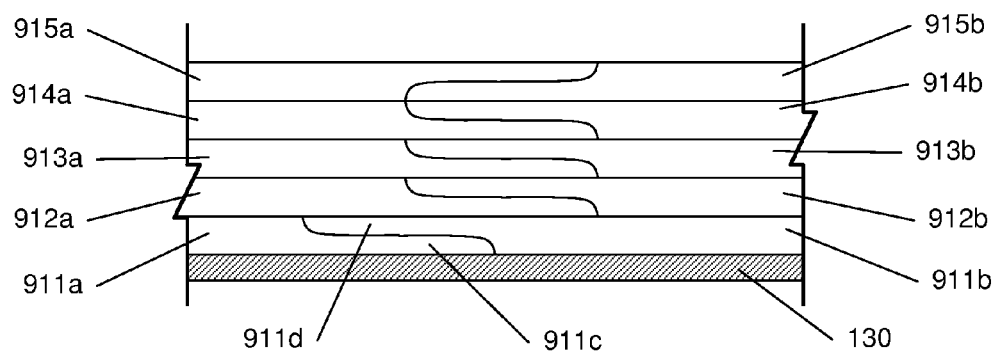
FIG. 9B is another example of a side view of meeting locations of different segments.

In the example of FIG. 9B, planning of the interface of the different layer segments at the meeting zone is made so that cross section characteristics of segment 911a (not in the figure) changes along the segment. On the left part it has a certain height and when it approaches section 911c the height of the segment is reduced. In this interface planning, reduced height is completed by segment 911b that has a similar certain height on the right side as does segment 911a. At section 911d the height of the segment is reduced and 911d is written over 911c so that parts 911c and 911d provide together a combined section having a cross section similar to the right part of section 911b and the left side of section 911a. This way the two segments combined, provide a height similar to the certain height of each segment away from the meeting zone (the zone where 911c and 911d present together) and the combined cross section of 911a and 911c is similar to the cross section of the segments outside the interfacing range. Reduced height of a segment can be provided using a writing head having a variable writing speed so as to dispense a variable amount of material per unit length of a segment and therefore write variable thickness of a segment.

As shown for segments 912a and 912b, the meeting zone where the segments overlap can be shifted along the layer contour in one layer to another location relative to the other.

As shown for segments 915a and 915b, in the meeting zone where the segments overlap the order of the segments in the vertical direction can be reversed. In the previous layers the right segment rests on top of the left segment. In the 915a and 915b segments example the left segment rests on top of the right segment.

Figure 9C:
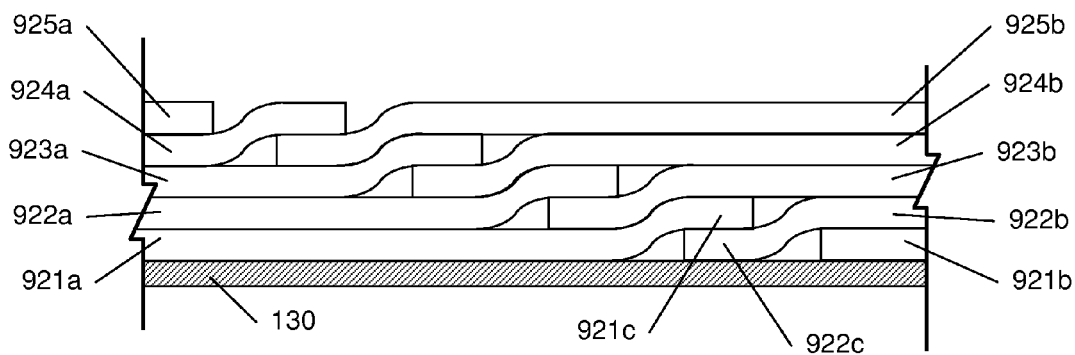
FIG. 9C is another example of a side view of meeting locations of different segments.

FIG. 9C illustrates an example where the segments cross section characteristics (not shown in the figure) remains similar along the segment, although at the meeting zone of two segments, segments the missing height of one segment is complemented by the height of the overlapping layer. This forms a type of layers with interleaving meeting sections. In one example, segment 921b is written first and then segment 922b is written so that a part of it, 922c is at the level of the layer of segment 921b and another part of it is on top of segment 921b. Then segment 921a is written with a part of it at the same height as segment 921b and the end part of it, 921c is written on top of 922c. This process continues with the rest of the segments to create the structure of interleaved meeting locations as shown in FIG. 9C. Also in this example at the meeting zone of a segment from one layer with a segment from an adjacent layer, each segment location changes to the layer of other segment.

It would be appreciated that the writing technology described in the disclosure are provided only as examples and are not limiting the scope of the method and apparatus. The writing technology could comprise of any additive manufacturing technique and it is not limited to, laser source and lenses for curing resin, a heat source, a UV source, a microwave source, electron beam source combined with material deposition and other sources configured to solidify the deposited/dispensed material, material solidifying, nozzle or orifice for dispensing or spattering material. A writing element can be of a fixed writing speed where the amount of material added to a 3D object per writing length unit is constant. A writing element can be of a variable writing speed where the amount of material added to a 3D object per writing length unit is variable.

What is claimed is:

1. An apparatus for additive manufacturing comprising:
at least two independently driven material dispensing heads configured to deposit a material and form at least one segment group of a same 3D object,
wherein at least one of the independently driven material dispensing heads has a capability to move in a direction perpendicular (Z-axis) to a material dispensing plane; and
wherein separation between at least one independently driven material dispensing head in direction perpendicular (Z-axis) to material dispensing plane and other independently driven material dispensing heads is at least one material layer; and
wherein at least one material dispensing head is configured to deposit the material at a variable deposition speed and to deposit a variable amount of material to form a material layer of variable cross section meeting zone of the separate segment groups at the same material layer.

2. The apparatus according to claim 1, further comprising:
an actuation mechanism constructed to move the at least two independently driven material dispensing heads simultaneously relative to a support configured to support the at least one layer of the 3D object being constructed; and
a computer configured to generate and control at least one dispensing head travel trajectory and a material dispensing function of each of the at least two independently driven material dispensing heads.

3. The apparatus according to claim 2, wherein the actuation mechanism of the at least two independently driven material dispensing heads includes a common track and is constructed to move the two independently driven material dispensing heads simultaneously.

4. The apparatus according to claim 1, wherein the two independently driven material dispensing heads are located along a common track at a distance from each other and wherein the distance between the two independently driven material dispensing heads along the track is adjustable.

5. The apparatus according to claim 1, wherein each of the at least two or more independently driven material dispensing heads supports simultaneous printing of at least two segment groups of the same 3D object and wherein at least one material dispensing head is configured to deposit the material at a variable deposition speed and to deposit a variable amount of material to form a material layer of variable cross section meeting zone of the separate segment groups at the same material layer.

6. The apparatus according to claim 5, wherein the segment groups differ from each other by at least one of layer length and number of layers.

7. The apparatus according to claim 5, wherein the segment groups differ from each other by number of layers and wherein the number of layers increases over time.

8. The apparatus according to claim 1, wherein the speed of at least one of the two or more independently driven material dispensing heads can be adjusted.

9. The apparatus according to claim 1, wherein the apparatus supports writing more than one layer at a time.

10. The apparatus according to claim 1, wherein the apparatus supports simultaneous spatial manipulation of the two or more dispensing heads.

11. The apparatus according to claim 1, wherein the at least two independently driven material dispensing heads deposit the material to form at least two different layers of the same 3D object.

12. An apparatus for additive manufacturing comprising:
at least two independently driven material dispensing heads configured to deposit a material and form at least one layer of a same 3D object;
an actuation mechanism constructed to move the at least two independently driven material dispensing heads relative to a support configured to support the at least one layer of the 3D object being constructed; and
a computer configured to generate and control at least one dispensing head travel trajectory and a material dispensing function of each of the at least two independently driven material dispensing heads,
wherein the independently driven material dispensing heads are configured to dispense material in at least a part of two separate segments of the same layer simultaneously, and
wherein a sum of lengths of each of the two separate segments of one segment group is similar to a sum of lengths of two other separate segments of another segment group.

13. The apparatus according to claim 12, wherein at least one material dispensing head is configured to deposit the material at a variable deposition (rate) speed and to deposit a variable amount of material to form a material layer of variable cross section meeting zone of the separate segments of the same material layer.

14. The apparatus according to claim 12, wherein the computer configured to generate and control at least one dispensing head travel trajectory is constructed and arranged to generate the travel trajectory of the two independently driven material dispensing heads to prevent collision between the two independently driven material dispensing heads.

* * * * *